United States Patent
Hopkins et al.

(10) Patent No.: US 10,326,612 B2
(45) Date of Patent: Jun. 18, 2019

(54) PACKET DATA PROTOCOL

(71) Applicant: UltraSoC Technologies Limited, Cambridge (GB)

(72) Inventors: Andrew Brian Thomas Hopkins, Folkestone (GB); Iain Craig Robertson, Cople (GB)

(73) Assignee: UltraSoC Technologies Limited (GB)

( * ) Notice: Subject to any disclaimer, the term of this patent is extended or adjusted under 35 U.S.C. 154(b) by 184 days.

(21) Appl. No.: 15/245,541

(22) Filed: Aug. 24, 2016

(65) Prior Publication Data
US 2017/0063570 A1 Mar. 2, 2017

(30) Foreign Application Priority Data
Aug. 25, 2015 (GB) .................................. 1515113.7

(51) Int. Cl.
*H04J 3/06* (2006.01)
*H04L 12/40* (2006.01)
*H04L 12/801* (2013.01)
*H04L 29/06* (2006.01)

(52) U.S. Cl.
CPC .......... *H04L 12/4013* (2013.01); *H04L 47/34* (2013.01); *H04L 65/80* (2013.01)

(58) Field of Classification Search
CPC ...... H04L 12/4013; H04L 65/80; H04L 47/34
See application file for complete search history.

(56) References Cited

U.S. PATENT DOCUMENTS

| 4,688,211 A * | 8/1987 | Van Simaeys ..... H04Q 11/0407 370/360 |
| 5,164,941 A * | 11/1992 | Delaney ................ H04L 12/407 370/447 |
| 2012/0144265 A1 | 6/2012 | Hwang et al. |
| 2012/0207027 A1 | 8/2012 | Duan et al. |
| 2015/0117177 A1 * | 4/2015 | Ganga ................... H04L 49/251 370/216 |

FOREIGN PATENT DOCUMENTS

| CA | 2775784 | 9/2005 |
| EP | 1235378 A1 | 8/2002 |
| EP | 1764980 A1 | 3/2007 |
| EP | 1885077 A1 | 2/2008 |
| WO | WO 98/58469 A1 | 12/1998 |
| WO | WO 02/37797 A1 | 5/2002 |

OTHER PUBLICATIONS

UK Search Report; Application No. GB1515113.7; dated Jul. 5, 2016; 4 pages.
UK Search Report for corresponding Appl No. GB1515113.7; dated Apr. 18, 2017; 2 pages.
UK Search Report for corresponding Appl No. GB1711391.1; dated Jan. 30, 2018; 5 pages.

* cited by examiner

*Primary Examiner* — Phuc H Tran
(74) *Attorney, Agent, or Firm* — Fish & Richardson P.C.

(57) ABSTRACT

A communication device configured to communicate according to a data protocol in which data is carried in packets over a serial data link and the communication device is arranged: to form packets for transmission over the link in such a way that every packet commences with a first bit value; and between transmitting successive packets to continuously transmit a second bit value opposite to the first bit value over the link.

14 Claims, 2 Drawing Sheets

PACKET DATA PROTOCOL

FIELD OF THE INVENTION

This invention relates to a packet data protocol.

BACKGROUND OF THE INVENTION

Packet data protocols are well known for carrying communications between two or more entities. A wide range of packet data protocols exist, each having advantages in different circumstances.

In many situations an assumption can be made in advance about the physical link over which a packet data protocol will be used. The protocol may be designed for use with a certain number of wires or with a certain expectation as to the available bandwidth. However, it is sometimes desirable for a device to be capable of using the same protocol to communicate with a range of other entities which support different physical links. For example, in the case of an integrated circuit (IC) module, it may be desirable for the same (or essentially the same) hardware module to be capable of being incorporated in a range of different composite ICs, for example system-on-chip ICs. It might not be known in advance what physical communication interfaces are provided by the other modules on the composite IC. Similarly, it might not be known in advance what physical off-chip communication interfaces will be available on the IC. In order for the module in question to be able to communicate without adaptation in a wide range of physical environments it would be preferable for the module to support a communication protocol that can operate over a range of physical interfaces. Similar considerations apply in other situations where a component might be required to be used in a non-standardised environment.

One particular complication when a protocol is intended to be used over a range of different physical links is that it may be unclear in advance whether a sideband will be available to provide indications of how the data is segmented. Another complication is that it may be unclear in advance what physical resources are available to support acknowledgement messages or retransmission requests.

Protocols already exist for passing serial communications on integrated circuits in particular. Examples include I2C, MDIO and SWD. However, these have various disadvantages. For example all those three protocols have a substantial encapsulation overhead that can reduce throughput. Packets of those protocols include headers that specify information such as type (e.g. read/write), destination address and other information; and also provide for data to be sent to delineate the start and end of packets.

There is a need for an alternative protocol for transmitting data, for example to improve the efficiency of data transmission.

SUMMARY OF THE INVENTION

According to one aspect there is provided a communication device configured to communicate according to a data protocol in which data is carried in packets over a serial data link and the communication device is arranged: to form packets for transmission over the link in such a way that every packet commences with a first bit value; and between transmitting successive packets to continuously transmit a second bit value opposite to the first bit value over the link.

The protocol may be such that the packets can vary in length. Alternatively, the protocol may require all packets to be of the same length.

The protocol may be such that not every packet includes a field indicating its length. This may apply even if the packet varies in length.

The protocol may be such that one or more of the packets can include no predetermined bit sequence signifying the end of that packet.

The device may be arranged to: receive a data frame for transmission; segment the data frame into a plurality of segments; and transmit the segments in a plurality of packets, the first of those packets including a field indicative of the length of the frame and all but the last of those packets being of a common predetermined length.

The device may be configured to form packets for transmission in such a way that those packets do not exceed a predetermined length. The device may be configured to perform a synchronisation operation comprising: continuously transmitting the second bit value over the link for at least the said length and immediately thereafter transmitting a packet over the link, that packet commencing with the first bit value.

The synchronisation operation may further comprise forming the packet that is sent immediately after having continuously transmitted the second bit value such that that packet comprises: a field indicative of the length of a frame; and content data of that frame.

The link may be a half-duplex link.

The link may be a single bit link, which may be a link that is capable of conveying a single data bit on each cycle of the link. The link may be a single wire link. The wire may be a physical conductor or a physical optical path. The wire may serve for bidirectional communications.

The device may be configured to, in response to having consecutively transmitted a predetermined number of packets over the link, cease transmission of packets over the link and operate to receive data sent over the link from another communication device. The device may be configured to, in response to identifying that the predetermined number of packets have been consecutively transmitted over the link by another device, commence transmission of packets over the link.

The device may be capable of performing a handover operation comprising: transmitting a packet of a predetermined format over the link and thereupon ceasing transmission of packets over the link and operate to receive data sent over the link from another communication device. The device may be capable of performing a handover operation comprising: determining how many packets have been consecutively transmitted over the link by the device and transmitting a number of further packets over the link, that number being equal to the difference between that determined number of packets and the said predetermined number of packets. Each of the further packets may have no payload. Each of the further packets may be of the minimum length permitted by the protocol.

The device may be capable of performing a handover operation comprising: receiving a packet of the predetermined format over the link and thereupon commencing transmission of packets over the link.

The device may be configured to, in response to having not transmitted a packet over the link during a period of a predetermined duration, operate to receive data sent over the link from another communication device.

The device may be being configured to, in response to another device having not transmitted a packet over the link during a period of the predetermined duration, commence transmission of packets over the link.

According to a second aspect there is provided a communication device configured to communicate according to a data protocol in which packets comprise a first flag in a first predetermined position and the device is configured to: a. form and transmit one or more packets comprising payloads and having the first flag set to a first predetermined value; b. in response to receiving a packet in which the first flag is of a second predetermined value, form and transmit a packet having the same payload as a previously transmitted packet and with the first flag set to a third value, the third value being different from the first value.

The first flag may be a single bit in length.

The first predetermined position is such that the first flag is located in a header, or alternatively in a trailer, of the packets.

The device may be configured to communicate according to a data protocol in which packets comprise a second flag in a second predetermined position and the device is configured to: a. receive one or more packets comprising payloads and having the second flag set to a fourth predetermined value; b. determine that retransmission of one of those packets is required, and in response to that determination select a value for the second flag in a subsequent packet, that flag being selected to be of a fifth predetermined value if retransmission is required, and otherwise to a sixth value different from the fifth value, and transmit a packet in which the second flag is set to that selected value.

The device may be configured to communicate according to a data protocol in which packets comprise a first flag in a first predetermined position and a second flag in a second predetermined position, the device being configured to: a. form and transmit one or more packets comprising payloads and having the first flag set to a first predetermined value; b. in response to receiving a packet in which the second flag is of a second predetermined value, form and transmit a packet having the same payload as a previously transmitted packet and with the first flag set to a third value, the third value being different from the first value. c. receive one or more packets comprising payloads and having the first flag set to a fourth predetermined value; d. determine that retransmission of one of those packets is required, and in response to that determination select a value for the second flag in a subsequent packet, that flag being selected to be of a fifth predetermined value if retransmission is required, and otherwise to a sixth value different from the fifth value, and transmit a packet in which the second flag is set to that selected value.

The fourth predetermined value may equal the first predetermined value. It may be a single bit value.

The fifth predetermined value may equal the second predetermined value. It may be a single bit value.

The third predetermined value may equal, or alternatively not equal, the sixth predetermined value. It may be a single bit value.

The protocol may be such that packets comprise an identifier field in a third predetermined position. The device may be configured to, in response to receiving a packet in which the first flag is of a second predetermined value, form and transmit a packet having the same payload as a previously transmitted packet identified by the identifier field of that received packet and with the first flag set to a third value.

The device may be configured to, in forming a packet for transmission, select a value for the first flag of that packet in dependence on whether the packet is to include the identifier field.

The identifier field may identify the transmitted packet by virtue of its order in a sequence of consecutively transmitted packets.

The identifier field may identify the transmitted packet by virtue of its order in a sequence of consecutively transmitted packets having no inherent serial number.

According to a third aspect there is provided a method of communicating data over a single-bit data link by means of a communication device as set out above.

According to a fourth aspect there is provided a method of communicating data over a single-bit data link by means of a communication device, the method comprising: forming packets for transmission over the link in such a way that every packet commences with a first bit value; and between transmitting successive packets, continuously transmitting a second bit value opposite to the first bit value over the link.

BRIEF DESCRIPTION OF THE DRAWINGS

The present invention will now be described by way of example with reference to the accompanying drawing.

In the drawing.

DETAILED DESCRIPTION

Figure 1:
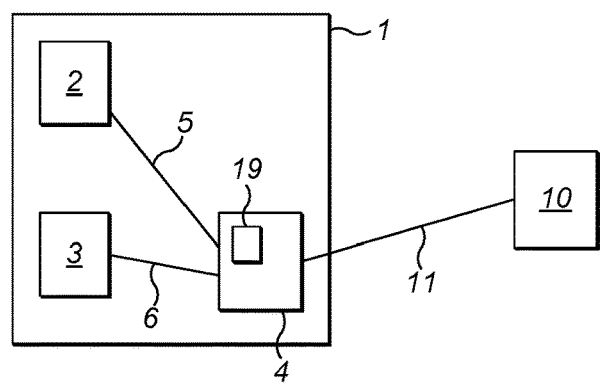
FIG. 1 shows an integrated circuit having various communication links.

FIG. 1 shows an integrated circuit 1. The integrated circuit is formed on a single semiconductor substrate. The integrated circuit comprises modules 2, 3, 4. Module 4 can communicate with modules 2 and 3 over data links 5, 6. Module 2 can also communicate with a separate device 10 over a data link 11. Each of modules 2, 3 and 4 together with separate device 10 are capable of communicating by means of the protocol described below. In one example, modules 2 and 3 might be part of a system-on-chip together with module 4, with module 4 being configured for collecting debugging information relating to the operation of modules 2 and 3, for example details of operations that have been performed by those modules, and passing that information to an analysis terminal 10.

Figure 2:
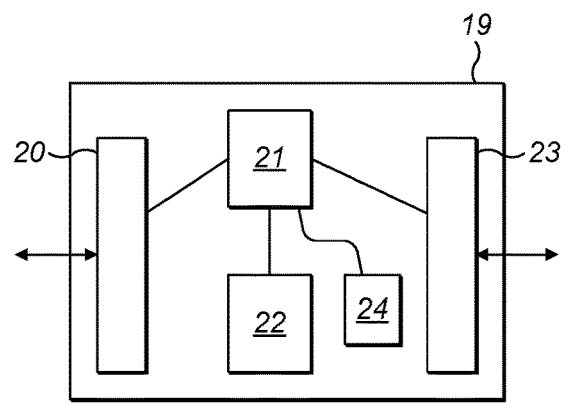
FIG. 2 shows a protocol processing engine.

FIG. 2 shows a protocol processing engine 19 that can be implemented in any of modules 2, 3, 4 and integrated circuit 10 in order to support the protocol described below. The protocol processing engine has a local interface 20 for receiving data from and presenting data to the host entity (e.g. module 2) in which it is implemented. Local interface 20 is coupled to a protocol processor 21. The protocol processor is a data processing device configured to execute program code stored in a non-transient manner in memory 22. The program code is such as to cause the protocol processor to implement the protocol described below. Instead of being controlled by software, the protocol processor could be implemented as dedicated hardware. A remote interface 23 is coupled to the protocol processor for transmitting data to and receiving data from a remote entity. When the protocol processing engine is implemented on an integrated circuit, as in the environment of FIG. 1, the remote entity could be implemented on that same integrated circuit or elsewhere. In operation, data for transmission can received over local interface 20 by the protocol processing engine. The protocol processing engine packages that data into appropriately formatted packets and transmits them to the intended destination over remote interface 23. The protocol processing engine can also handle ancillary tasks such as computation of error check data, retransmission of data as required, and link state synchronisation. At the opposite end of the link a similar protocol processing engine receives the packets over its remote interface 23, extracts the payload or traffic data from the packets and presents it to its host over its local interface 20. That protocol processing engine also handles ancillary tasks such as checking received data for errors, requesting retransmission or providing acknowledgements, and link synchronisation.

The protocol used by the protocol processing engine will now be described in detail.

Certain parameters governing the operation of the protocol are defined and stored in a settings memory 24 which can be read by processor 21. If required, processor 21 may also be able to write settings to memory 24. The parameters may be pre-stored in memory 24 when the protocol processing engine is manufactured, or may be negotiated between the protocol processing engine and the engine with which it is connected. The parameters may include:

maximum packet length (MPL), e.g. 1024 bits;
start of packet (SOP) value, e.g. 1;
inter-packet gap (IPG) value, e.g. 0;
EOP token length (ETL), e.g. 9 bits;
length field length (LFL), e.g. 8 bits;
maximum packet delay (PMD); e.g. 1 ms;
packet handover number (PHL), e.g. 16.

The SOP and IPG values are selected to be single-bit values and different from each other. The settings have the same values in the engines at both ends of a link. This may be achieved by pre-configuration, e.g. at manufacture, or by negotiation between the entities.

When the engine at one end of a link is to send data, firstly blocks of data to be transmitted are received by the processor 21 over local interface 20. (Step 40 in FIG. 2). Those blocks are termed frames. Data is transmitted over a physical link (e.g. links 5, 6 and 11) according to the present protocol in the form of data packets. Each packet includes a payload. The protocol is such that the payload of any packet includes data from only a single frame. Short frames may be carried entirely within a single packet. Longer frames are segmented and the segments are carried in multiple packets.

The environment in which the engine receives the frames may be such that all frames contain a length field at their start when they are received by the engine, the length field indicating the length of the frame. In that case the engine can use the length field already included in the frame for the purposes of the present protocol. If the frames do not include a length field, or cannot be relied upon to do so, then the processor can determine the length of the frame (e.g. in bits) and add a length field (LF) of length LFL to the start of the frame, the value of LF indicating the frame length. (Step 41). The LF can be padded with zeros so that it has length LFL. The value of LF may by convention include or exclude the length field itself. For the purpose of the present description LF will be assumed to include the length field, as will the frame itself.

Figure 3:
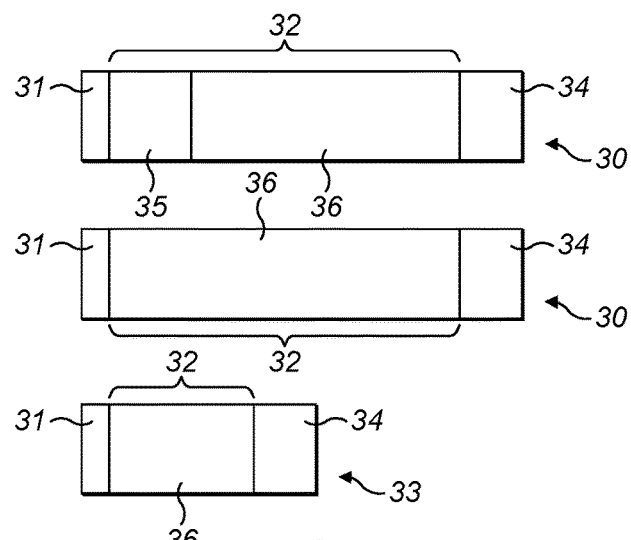
FIG. 3 shows packet formats.

The format of transmission of a generic frame is illustrated in FIG. 3. It involves:

Zero or more packets 30 of length MPL, each commencing with the SOP value 31, having a payload 32 following the SOP value and having an EOP block 34 at the end of the packet. The length of the SOP value is one bit. The length of the EOP block is set by parameter ETL. The length of the payload in packets of this type is equal to MPL−1−ETL.

One packet 33 of length less than or equal to MPL, commencing with the SOP value 31, having a payload 32 following the SOP value and having an EOP block 34 at the end of the packet. The length of the payload in packets of this type is less than or equal to MPL−1−ETL.

If the frame is short enough then it can be carried in a single packet of the second type. For that to be done, the frame must not be longer than MPL−1−ETL. Otherwise, the frame is carried one or more packets of the first type plus a single packet of the second type. The frame is included in the packets' payloads as the frame length field 35 (which appears at the beginning of the first packet in which the frame is carried) and the frame's own payload 36.

Figure 4:
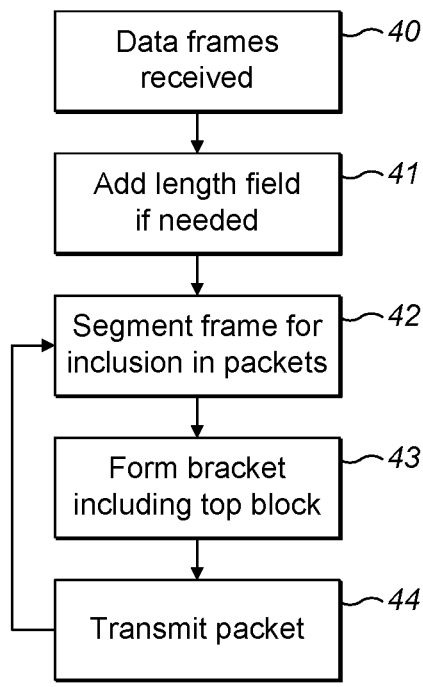
FIG. 4 shows the process for segmenting a frame and transmitting it as packets.

If the frame is not longer than MPL−1−ETL then the engine forms a packet for transmission consisting of one bit of the SOP value, followed by the frame, followed by the EOP block. If the frame is longer than MPL−1−ETL then the engine segments the data string consisting of the frame plus the EOP block into a series of segments. (Step 42 in FIG. 4). Each of those segments except the last is of length MPL−1−ETL. Then the engine forms a series of packets for transmission, each consisting of one bit of the SOP value, followed by a respective one of the segments and a respective end-of-packet token (EOP) 34. (Step 43). The content of the EOP block will be discussed further below. It could, for example, include retransmission and error check data. The packets are transmitted in order so that the frame can be reassembled successfully at the receiver and so that the first packet carrying the frame commences with the length field LF. (Step 44). The steps of taking a segment of the frame, forming an EOP token, forming a packet and transmitting it are repeated until the frame has been transmitted. It may be that the entity transmitting the frame has to interrupt transmission of the packets carrying the frame as a result of it losing ownership of the link. In that case it buffers the data still to be transmitted, or that might need to be retransmitted, and resumes transmission of the frames when it next has ownership of the link.

It will be noted that a feature of the protocol is that the packets are not constrained to be of equal length, but nevertheless there is no need to include in each packet data demarking the end of the packet. This is because the length of each packet in the sequence carrying a frame can be inferred by the receiver from the frame length data included at the start of the first frame in the sequence.

Between each packet the transmission line is driven to the IPG value. This marks an inter-packet gap.

At the recipient, the start of each packet can be distinguished by the transition from the IPG value to the SOP value. This is why the IPG value is chosen to be different to the SOP value. The recipient maintains a record of whether it is currently receiving a frame. When the first packet representing a frame is received the recipient considers the first LFL bits following the SOP flag and extracts the LF value. From that value the recipient knows how many packets the frame will be segmented into. The recipient can identify the end of a packet because it knows its length from MPL and the LF value. As it receives successive packets the recipient reassembles the frame from the payloads of the packets. Once all the data of the frame has been received, which can be identified from counting the received frame data and:

(a) in the case of packets 30 comparing it to MPL−1−LFL or (b) in the case of packets 31 comparing it to the value that is the LF value from the first packet of the frame modulo (MPL−1−LFL), the next bits will represent the EOP block. The length of the EOP block is ETL, so the next n bits received after the end of the frame payload, where n equals ETL can be taken to be the EOP block. The recipient extracts the EOP block and processes it as necessary. For example, the EOP block may include error check data such as a cyclic redundancy check (CRC) over the original packet data. In that case, the recipient repeats the error check computation and compares its result to the received EOP block to determine whether the packet has been successfully received.

From time to time an engine that can transmit over the link can perform a line synchronisation operation. The purpose of the line synchronisation operation is to bring the recipient into synchronisation with the logical state of the link as viewed by the transmitter. The line synchronisation procedure is to transmit the IPG bit for equal to or greater than MPL bits. This line synchronisation procedure avoids the need for out of band transmission. The next data following the synchronisation procedure will be the SOP value followed by a payload that commences with a length field of length LFL. The synchronisation operation is performed between frames being transmitted.

Instead of a frame commencing with a length field of length LFL it may commence with a header of another standard format which includes a field indicating the length of the frame. The header may include other data relating to the frame. Provided the recipient can derive the frame length from the header, that is sufficient information for the recipient to infer the number and length of the succeeding packets based on its stored MPL value.

The present protocol is capable of being used over full duplex physical links (i.e. links where there are physical paths that can be used simultaneously in both directions) and over half-duplex physical links (i.e. links where there is a single physical path that is shared for both directions).

When the protocol is being used over a half-duplex link there is a need to govern which device can transmit, and to regulate the handover of transmission between the devices. This can be done in the following way. Initially, one entity using the link is defined as a master. The master could be whichever entity is a host to the other device (e.g. a debug host), or the master could be designated by negotiation. Immediately after the link has been reset the master device is the owner and transmits first. Handover of the link to the other device may occur in any of the following ways:

1. Reaching the PHL limit—As indicated above, the number PHL can be configured. The entity that is the owner of the link can transmit a maximum of PHL packets in turn, after which ownership transfers implicitly to the other entity. Preferably PHL is constrained to be not less than a maximum value, for example 16. Setting the value PHL allows link efficiency to be balanced against responsiveness.

2. Voluntary handover—The entity that is the owner of the link can transmit a packet of a handover format whereupon ownership of the link transfers to the other entity. The handover format may be indicated by a flag of a predetermined value in a predetermined location in the packet 3. Timeout—If the owner does not transmit a packet over the link within a period of MPD since the last packet it transmitted then ownership transfers implicitly to the other entity. The owner of the link can prevent timeout by transmitting a data packet within the period of MPD since the last packet it transmitted. That may be a packet containing part of a frame, or it may be a packet of an idle format which carries no payload. The idle format may be indicated by a flag in a predetermined value in a predetermined location in the packet.

4. Transfer on end of frame—As indicated above, when a transmitting entity finishes transmitting a frame it transmits a packet of type 33. At that point ownership could transfer automatically to the other entity.

In one configuration that has been found to be efficient, the devices are configured to transfer ownership only in case 1 above. That is, only when the PHL limit is reached. In this embodiment, in order to force a handover if a transmitting entity has no traffic data to transmit, that entity could transmit sufficient null frames to cause the PHL limit to be reached. Those null frames could conveniently be short frames, for example frames having no payload, or a minimal length payload, allowing them to be sent quickly. They could be idle frames whose format is indicated by a flag in a predetermined value in a predetermined location in the packet. That location may be in the packet header. In this embodiment, each entity may be configured to run a timer which times the duration since the entity last transmitted a packet. Each entity may be configured to, in response to that timer reaching or exceeding a predetermined timeout value, transmit sufficient null frames to cause the PHL limit to be reached. Those null frames can be transmitted in quick succession. In this way, handover can be forced and the right to transmit will not stall with a single entity.

Once the engine of one entity has transmitted an EOP it continuously transmits the IPG value to represent an inter-packet gap. This can be exploited to avoid clashes on a half-duplex link. Once an engine has transmitted an EOP subsequent to which ownership of the link will change, it transmits the IPG value for a predetermined period and then deactivates its output enable. Meanwhile, the other entity enables its output enable, begins continuously transmitting the IPG value and continues doing so for the same predetermined period. Then that other entity can begin normal transmission operations. This procedure ensures that the link is never left floating, and avoids timing conflicts between the two entities. It is preferred that this process takes place as quickly as possible. For example, the process may be accomplished in only two clock cycles, in the following manner:

Cycle 0: The transmit driver of entity A outputs last cycle of its EOP signal;

Cycle 1: The transmit driver of entity A outputs the IPG value;

Cycle 2: The transmit driver of entity A floats and the transmit driver of entity B outputs the IPG value;

Cycle 3: The transmit driver of entity B can output an SOP signal or an IPG signal, depending on whether it has data to send.

In this example the IPG occupies cycles 1 and 2. Depending on timing delays and the degree of synchronisation between entities A and B, at the beginning of cycle 2, both drivers may be driving at the same time for a short while. However, this is not a problem because they are driving the line to the same value.

In full duplex mode the transmit and receive paths are independent so there is no need to output the IPG value between packets.

The content of the EOP field will now be described.

The EOP field is used to convey error check and status information to a link partner. The format of the EOP field can vary depending on which features are to be implemented.

In one embodiment the EOP field supports retransmission in only a single direction over a half-duplex link. This may, for example, be used on a link that is being used wholly or primarily to report status or activity information from one entity ("device") to the other ("host"). In that situation it may be desirable to allow for retransmission in the host to device direction, but retransmission in the other direction might not be needed. In this embodiment the EOP field can consist of a single bit. The significance of that bit depends on the direction of the packet. In a packet transmitted in the direction over which retransmission is not supported the state of the EOP bit indicates whether the last packet sent in the opposite direction should be retransmitted. For example, a value of 1 may indicate that the last packet must be retransmitted and a value of 0 indicates otherwise. This allows the receiving device to block incoming data if for any reason it cannot accept it, by continually requesting retransmission until it is able to accept data. In the opposite direction the EOP bit indicates whether the payload of the packet in which it occurs is being retransmitted. For example, a value of 1 may indicate that a packet is a resend, whereas a value of 0 indicates otherwise. Thus, in this embodiment a first entity can initially transmit a packet with EOP equal to 0, indicating a fresh packet. If the second entity cannot accept that packet then it transmits a packet with EOP equal to 1. The first entity then retransmits the packet, this time with EOP equal to 1. If the second entity still cannot accept the packet then it again transmits a packet with EOP equal to 1 and the process repeats. Otherwise, it accepts the packet and does not request retransmission.

In a second embodiment the same principle is used to permit retransmission in both directions. Now the EOP field contains two bits, one operating as described above to indicated acknowledgement/non-acknowledgement and transmission/retransmission in a first direction and the other indicating the analogous information for the opposite direction.

An advantage of implementing a signal to indicate whether or not a packet is a retransmission is that during the period between one entity requesting a retransmission and the other entity being able to satisfy that request it is possible that the second entity may have initiated the transmission of one or more other packets. In that situation the first entity needs to be able to identify whether packets received from the second entity are responsive to the retransmission request. In one convenient mode of operation, a device may be configured to, once it has requested a retransmission, discard all packets received from the other entity until it receives a packet that is indicated as being a retransmission. Similarly, a device may be configured to, on receiving a request for retransmission of a packet, automatically retransmit any packets it had transmitted subsequent to its previous transmission of the packet of which retransmission was requested.

In the examples discussed above in relation to the EOP field, it is assumed that PHL is set to 1, so that each entity can only transmit a single packet before handing over the link to the other entity for transmission. If PHL is set to a number greater than 1 then the EOP field also includes a packet identifier field for indicating which packet is to be retransmitted. To identify a packet for retransmission it may be designated by its order in the sequence of packets since the last change of ownership. For example, if the fourth packet since the last change of ownership is to be retransmitted then the packet identifier field can be set to 3 (assuming numbering starts from zero).

One example of how the retransmission arrangement may be used is to allow a receiving entity to apply backpressure to the transmitting entity if the receiving entity is temporarily unable to process packets. For example, suppose the entities (A and B) are communicating over a half-duplex link with a maximum of four packets being sent before ownership changes (i.e. PHL=4). Suppose entity A sends four packets to entity B but B is only able to process the first two of those packets. The third and fourth packets need to be retransmitted. Those are packets numbers 2 and 3 in the sequence, numbering from zero. Once those four packets have been transmitted ownership of the link changes on the "PHL limit" basis discussed above. Then entity B transmits a packet with a bit set to request retransmission and with the packet identifier field set to 2, to indicate that packet number 2 should be retransmitted. Entity B can then transmit a packet of the handover format to force a prompt change of ownership, or can wait for ownership to transfer due to a timeout. Alternatively, as described above, entity B can force a handover by sending sufficient packets (e.g. empty packets) that the PHL limit is reached. Then entity A retransmits packet number 2. It is possible for entity B to then request retransmission of packet number 3 and for that to then be retransmitted by entity A. However, it is more preferable for each entity to be configured to automatically begin retransmitting its whole sequence of packets starting from the one whose retransmission has been requested. In this approach, on receiving a retransmission request indicating packet 2, entity B automatically retransmits both packets 2 and 3. Entity B may have more packets to transmit to entity A, so in the four-packet window entity B has to transmit it could retransmit packets 2 and 3 and then transmit two further packets. If entity A needs to request retransmission of any of those packets then in the next retransmission request it designates the first packet for retransmission based on its sequence in that last four-packet block. So if the packet 3 needed to be retransmitted then the packet identifier field sent by A would indicate the value 1.

Figure 5:
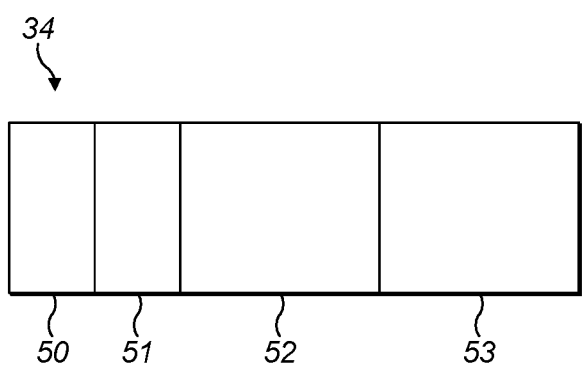
FIG. 5 shows an example of an EOP block.

FIG. 5 shows an example of how the EOP block 34 can be formatted. The block includes:

- A first bit 50 representing retransmission information for data being conveyed in a first direction over the link. If the packet containing block 34 is being transmitted in that first direction then bit 50 indicates whether the present packet is a retransmission of an earlier packet, and if the packet containing block 34 is being transmitted in the opposite (second) direction then bit 50 indicates whether retransmission of an earlier packet is requested.
- A second bit 51 representing retransmission information for data being conveyed in the second direction over the link. If the packet containing block 34 is being transmitted in that second direction then bit 51 indicates whether the present packet is a retransmission of an earlier packet, and if the packet containing block 34 is being transmitted in the opposite (first) direction then bit 51 indicates whether retransmission of an earlier packet is requested.
- A field 52 indicating, if either bit 50 or 51 indicates that retransmission is requested, for which sequence number of packet retransmission is requested. This field can be omitted completely if no retransmission is requested. This is desirable as retransmission is desirably a rare event, and so the additional overhead of this field can then only be incurred when required. In this way, most packets will only have a 2-bit EOP. It is advantageous for field 52 to be the final field of the packet since then there is no need for signalling overhead to indicate whether field 52 is present. As indicated above, the EOP field may also include other information, for example an error check field 53 for the packet.

The significance of bits 50 and 51 may be such that one indicates retransmission or not in both directions and the other indicates a retransmission request or not in both directions.

When retransmission is being requested, that may be done in a packet having no payload. Alternatively, it may be done in a packet that contains a payload and is also being used for the transmission of frame or other traffic data.

In the case of full duplex transmission the same retransmission scheme is used. One additional consideration is that since there is no change of ownership on a full duplex link a packet for retransmission must be identified by a serial number based on a scheme other than the index of the packet since the last change of ownership. One option is to provide each packet with a serial number, e.g. in a header, and to identify the packet for retransmission by its serial number. Conveniently, groups of packets can represent frames, each frames can be identified by a sequence number and each packet that makes up that frame can be referenced by a packet number within that frame. In this situation a packet can be identified for retransmission by its frame sequence number and its packet number within that frame.

The protocol described above can be applied over a range of physical data links. In one example, the protocol can be used over a single wire, as a half-duplex protocol. In another example, the protocol can be used over two wires, as a full duplex protocol, each of those wires operating unidirectionally. In these cases the protocol operates in a bit-serial fashion. The protocol can also be used with more than one wire in each direction with bits being sent simultaneously over the wires in parallel, either in half-duplex mode (with those wires operating alternately in each direction) or in full duplex mode (with multiple ones of those wires operating for transmission in one direction at the same time as one or more operate for transmission in the other direction).

As indicated above, one application of the present protocol is in transmitting data regarding the status or previous operations of an integrated circuit or a module on an integrated circuit for debugging purposes. The present protocol can be applied in other applications, for example for transmitting data of any sort over a serial hardware link.

The entities at each end of a link preferably maintain local clocks which are synchronised so they can distinguish signals on the link on a common timebase. Signals on the link are preferably sent and received according to that timebase.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication device configured to communicate according to a data protocol in which data is carried in packets over a serial data link and the communication device comprising:
   a processor and a non-transitory computer-readable storage medium encoded with instructions that, when executed, cause the processor to perform operations comprising:
   forming packets for transmission over the link in such a way that every packet commences with a first bit value;
   transmitting the formed packets over the link; and
   between transmitting successive ones of the formed packets, continuously transmitting a second bit value opposite to the first bit value over the link.

2. A communication device as claimed in claim 1, wherein the protocol is such that the packets can vary in length.

3. A communication device as claimed in claim 2, wherein the protocol is such that not every packet includes a field indicating its length.

4. A communication device as claimed in claim 2, wherein one or more of the packets includes no predetermined bit sequence signifying the end of that packet.

5. A communication device as claimed in claim 1, wherein the operations comprise:
   receiving a data frame for transmission;
   segmenting the data frame into a plurality of segments; and
   transmitting the segments in a plurality of packets, the first of those packets including a field indicative of the length of the frame and all but the last of those packets being of a common predetermined length.

6. A communication device as claimed in claim 1, wherein the operations comprise:
   forming packets for transmission in such a way that those packets do not exceed a predetermined length; and
   performing a synchronisation operation comprising continuously transmitting the second bit value over the link for at least the said length and immediately thereafter transmitting a packet over the link, that packet commencing with the first bit value.

7. A communication device as claimed in claim 6, wherein the synchronisation operation further comprises forming the packet that is sent immediately after having continuously transmitted the second bit value such that that packet comprises:
   a field indicative of the length of a frame; and
   content data of that frame.

8. A communication device as claimed in claim 1, wherein the link is a half-duplex link, a single bit link, or a single wire link.

9. A communication device as claimed in claim 8, wherein the operations comprise, in response to having consecutively transmitted a predetermined number of packets over the link, ceasing transmission of packets over the link and operating to receive data sent over the link from another communication device.

10. A communication device as claimed in claim 8, wherein the operations comprise, in response to identifying that the predetermined number of packets have been consecutively transmitted over the link by another device, commencing transmission of packets over the link.

11. A communication device as claimed in claim 8, wherein the operations comprise performing a handover operation comprising:
   transmitting a packet of a predetermined format over the link and thereupon ceasing transmission of packets over the link and operating to receive data sent over the link from another communication device.

12. A communication device as claimed in claim 8, wherein the operations comprise performing a handover operation comprising:
receiving a packet of the predetermined format over the link and thereupon commencing transmission of packets over the link.

13. A communication device as claimed in claim 8, wherein the operations comprise, in response to having not transmitted a packet over the link during a period of a predetermined duration, operating to receive data sent over the link from another communication device.

14. A communication device as claimed in claim 8, wherein the operations comprise, in response to another device having not transmitted a packet over the link during a period of the predetermined duration, commencing transmission of packets over the link.

\* \* \* \* \*